(12) United States Patent
Fan et al.

(10) Patent No.: US 12,420,262 B2
(45) Date of Patent: Sep. 23, 2025

(54) CHROMATOGRAPHIC COLUMN HAVING STATIONARY PHASE THICKNESS GRADIENT

(71) Applicant: THE REGENTS OF THE UNIVERSITY OF MICHIGAN, Ann Arbor, MI (US)

(72) Inventors: Xudong Fan, Saline, MI (US); Hongbo Zhu, Johnson City, TN (US); Jinyan She, Ann Arbor, MI (US); Maxwell Wei-Hao Li, Troy, MI (US); Katsuo Kurabayashi, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 774 days.

(21) Appl. No.: 17/779,247

(22) PCT Filed: Nov. 25, 2020

(86) PCT No.: PCT/US2020/062266
§ 371 (c)(1),
(2) Date: May 24, 2022

(87) PCT Pub. No.: WO2021/137979
PCT Pub. Date: Jul. 8, 2021

(65) Prior Publication Data
US 2022/0410122 A1 Dec. 29, 2022

Related U.S. Application Data

(60) Provisional application No. 62/940,038, filed on Nov. 25, 2019.

(51) Int. Cl.
*B01L 3/00* (2006.01)
*B01D 15/08* (2006.01)
(Continued)

(52) U.S. Cl.
CPC ........... *B01J 20/287* (2013.01); *B01J 20/285* (2013.01); *B01J 20/3282* (2013.01);
(Continued)

(58) Field of Classification Search
CPC .... B01J 20/287; B01J 20/285; B01J 20/3282; G01N 30/6065; G01N 30/6078; G01N 2030/025
See application file for complete search history.

(56) References Cited

U.S. PATENT DOCUMENTS

| 5,196,039 A | 3/1993 | Phillips et al. |
| 8,377,309 B2 | 2/2013 | Steinecker |

(Continued)

FOREIGN PATENT DOCUMENTS

| CN | 1419123 A | 5/2003 |
| JP | S52055594 A | 5/1977 |

(Continued)

OTHER PUBLICATIONS

Zhu, Hongbo. Development of Micro Gas Chromatographs and Micro Photoionization Detectors. Diss. 2019. (Year: 2019).*

(Continued)

*Primary Examiner* — Jennifer Wecker
*Assistant Examiner* — Oyeleye Alexander Alabi
(74) *Attorney, Agent, or Firm* — Harness, Dickey & Pierce, P.L.C.

(57) ABSTRACT

A gas chromatography device for peak focusing of one or more target analytes is provided that include a chromatographic column with an inlet and an outlet. A stationary phase is deposited inside the chromatographic column and has a positive thickness gradient. The stationary phase extends from the inlet to the outlet and has a first thickness at the inlet of the chromatographic column and a second thickness at the outlet of the chromatographic column. The (Continued)

second thickness is at least about 10% greater than the first thickness. Methods of peak focusing in a gas chromatography device, method of verifying peak focusing in a gas chromatography device and creating a gas chromatography device having a chromatographic column with a positive thickness gradient are also provided.

18 Claims, 9 Drawing Sheets

(51) Int. Cl.
| | |
|---|---|
| B01F 33/302 | (2022.01) |
| B01F 33/3033 | (2022.01) |
| B01J 20/285 | (2006.01) |
| B01J 20/287 | (2006.01) |
| B01J 20/32 | (2006.01) |
| B01L 7/00 | (2006.01) |
| B01L 9/00 | (2006.01) |
| B65G 47/80 | (2006.01) |
| B82Y 20/00 | (2011.01) |
| B82Y 30/00 | (2011.01) |
| B82Y 40/00 | (2011.01) |
| C12M 1/34 | (2006.01) |
| C12M 3/06 | (2006.01) |
| C12N 1/14 | (2006.01) |
| C12N 1/20 | (2006.01) |
| C12Q 1/02 | (2006.01) |
| C12Q 1/6806 | (2018.01) |
| C12Q 1/6844 | (2018.01) |
| C12Q 1/6848 | (2018.01) |
| C12Q 1/686 | (2018.01) |
| G01N 15/10 | (2024.01) |
| G01N 15/14 | (2024.01) |
| G01N 15/1433 | (2024.01) |
| G01N 21/29 | (2006.01) |
| G01N 21/65 | (2006.01) |
| G01N 30/02 | (2006.01) |
| G01N 30/60 | (2006.01) |
| G01N 30/72 | (2006.01) |
| G01N 33/543 | (2006.01) |
| G01N 33/557 | (2006.01) |
| G01N 33/574 | (2006.01) |
| G01N 33/58 | (2006.01) |

(52) U.S. Cl.
CPC ..... *G01N 30/6065* (2013.01); *G01N 30/6078* (2013.01); *G01N 2030/025* (2013.01)

(56) References Cited

U.S. PATENT DOCUMENTS

| | | |
|---|---|---|
| 8,778,059 B2 | 7/2014 | Steinecker et al. |
| 2006/0144237 A1 | 7/2006 | Liang et al. |
| 2009/0013993 A1 | 1/2009 | Bird et al. |
| 2012/0118156 A1* | 5/2012 | Steinecker .......... B01D 15/206 427/230 |
| 2012/0118806 A1 | 5/2012 | Steinecker |

FOREIGN PATENT DOCUMENTS

| | | |
|---|---|---|
| JP | H09080038 A | 3/1997 |
| WO | WO-2021137979 A2 | 7/2021 |

OTHER PUBLICATIONS

Japanese Office Action regarding Patent Application No. 2022530329, dated Sep. 20, 2023.
Hongbo Zhu, Development of Micro Gas Chromatographs and Micro Photoionization Detectors, Aug. 2019, 96-117, https://deepblue.lib.umich.edu/bitstream/handle/2027.42/150066/hongbo_1.pdf?sequence=&isAllowed=n.07 Aug. 2019;Entire Document.
Second Examiner's Report for Canadian Patent Application No. 3162889, issued Jan. 27, 2025.
First Office Action for Chinese Patent Application No. 202080094249.7, issued Feb. 22, 2024.
International Search Report and Written Opinion of the International Search Authority issued in PCT/US2020/062266, mailed on Aug. 23, 2021; ISA/US.
Zhu, H., "Development of Micro Gas Chromatographs and Micro Photoionization Detectors.", University of Michigan., Https://deepblue.lib.umich.edu/bitstream/handle/2027.42/150066/hongbo_1.pdf?sequence=1&isAllowed=n.07 Aug. 2019; Entire Document.
Ohio Valley Specialty Compay., "OV-1 Capillary Columns from Ohio Valley Specialty Company.", Https://ovsc.com/product-category/products/gc-capillary-columns-accessories/ov-1-capillary-columns. Jul. 20, 2021; p. 1.
Wilson, RB et al., "Fast, High Peak Capacity Separations in Gas Chromatography-Time-of-Flight Mass Spectrometry.", Analytical Chemistry. Mar. 26, 2012; abstract; p. 4168, table 1; p. 4169, col. 2, second paragraph; p. 4172, col. 2, figure 5A; DOI: 10.1021/ac300481k.
First Examiner's Report for Canadian Patent Application No. 3162889, issued Jan. 31, 2024.
First Office Action for Russian Patent Application No. 2022115848, issued Mar. 11, 2024.
Extended European Search Report for EP Application No. 20909884.7 issued Oct. 26, 2023; 10 pages.
Zhu, Hongbo, "Development of Micro Gas Chromatographs and Micro Photoionization Detectors"; PhD Dissertation, University of Michigan, partially embargoed from Jul. 8, 2019 until May 1, 2021; Retrieved from https://deepblue.lib.umich.edu/handle/2027.42/150066 (pp. 1-161).
Watkinson, C., Declaration regarding Partial Embargo of Zhu, Hongbo: "Development of Micro Gas Chromatographs and Micro Photoionization Detectors," (170 pages).
Written Opinion and Search Report for SG Application No. 11202205495W issued Aug. 9, 2024.
Second Office Action issued Sep. 26, 2024, for CN Application No. 202080094249.7; 8 pages.
Second Office Action for Japanese Application No. 2022530329 issued Jan. 30, 2024.

* cited by examiner

CHROMATOGRAPHIC COLUMN HAVING STATIONARY PHASE THICKNESS GRADIENT

CROSS-REFERENCE TO RELATED APPLICATIONS

This application is a 371 U.S. National Phase of International Application PCT/US2020/062266, filed on Nov. 25, 2020, which claims the benefit of U.S. Provisional Application No. 62/940,038, filed on Nov. 25, 2019. The entire disclosures of the above applications are incorporated herein by reference.

GOVERNMENT SUPPORT

This invention was made with government support under OH011082 awarded by the Centers for Disease Control and FA8650-17-C-9106 awarded by the U.S. Air Force, Air Force Materiel Command. The government has certain rights in the invention.

FIELD

The present disclosure relates to gas chromatography devices including chromatographic columns having a stationary phase with a positive thickness gradient to enhance peak focusing.

BACKGROUND

This section provides background information related to the present disclosure which is not necessarily prior art.

Gas chromatography (GC) is an analytical method for separating gas phase compounds via separation columns, allowing for analysis and identification of compounds in a target sample. GC is widely used in many industries to separate and identify target analytes, such as volatile organic compounds or semi-volatile organic compounds. GC is particularly useful for analyzing complex samples having multiple target analytes that require individual detection. GC works by observing "peaks" of chemicals passing through a separation column. Thus, a sample having different chemicals or target analytes is introduced via an injector into a column. The column comprises a material inside that is considered a stationary phase. Different portions of the sample pass through the column at different rates (due to each chemical's physical and chemical interactions with the material contained in the column). As the target analytes are eluted from and exit the column, a detector can differentiate the species eluted over time based on the rate at which the analytes pass through the column. Such analytes can be electronically identified and/or quantified during or after the detection. It is desirable to improve separation within a chromatographic column to enhance performance and GC detection capability.

SUMMARY

This section provides a general summary of the disclosure, and is not a comprehensive disclosure of its full scope or all of its features.

In certain aspects the present disclosure relates to a gas chromatography device for peak focusing of one or more target analytes. A chromatographic column has an inlet and an outlet, where the inlet receives a sample comprising one or more target analytes that exits the column at the outlet. A stationary phase is deposited inside the chromatographic column and having a positive thickness gradient. The stationary phase extends from the inlet to the outlet and has a first thickness at the inlet of the chromatographic column and a second thickness at the outlet of the chromatographic column. The second thickness is at least about 10% greater than the first thickness.

In one aspect, the first thickness is greater than or equal to about 10 nm to less than or equal to about 10 micrometers and the second thickness is greater than or equal to about 30 nm to less than or equal to about 30 micrometers.

In one aspect, the second thickness is at least about 100% greater than or equal to the first thickness.

In one aspect, the second thickness is at least about 300% greater than or equal to the first thickness.

In one aspect, the chromatographic column is a microgas chromatographic column.

In one aspect, the stationary phase comprises a siloxane polymer.

In one further aspect, the siloxane polymer comprises at least one alkyl group or aryl group comprising 1 to 30 carbon atoms.

In one aspect, a cross-sectional shape of the chromatographic column is selected from the group consisting of: circular, oval, rectangular, and triangular.

The present disclosure also relates to a method of peak focusing in a gas chromatography device. The method includes introducing two or more target analytes into an inlet of a chromatographic column comprising a stationary phase deposited inside the chromatographic column and having a positive thickness gradient. The stationary phase extends from the inlet to the outlet and has a first thickness at the inlet of the chromatographic column and a second thickness at the outlet of the chromatographic column. The second thickness is at least about 10% greater than the first thickness. The method further includes separating two or more target analytes in the chromatographic column. The method also includes eluting the two or more target analytes from the outlet of the chromatographic column.

In one aspect, the two or more target analytes are volatile organic compounds (VOCs).

In one aspect, at least one of the two or more target analytes comprises an aromatic compound and an overall peak focusing rate for the aromatic compound is greater than or equal to about 25%.

In one aspect, at least one of the two or more target analytes comprises an alkane compound and an overall peak focusing rate for the alkane compound is greater than or equal to about 10%.

In one aspect, the first thickness is greater than or equal to about 10 nm to less than or equal to about 10 micrometers and the second thickness is greater than or equal to about 30 nm to less than or equal to about 30 micrometers.

In one aspect, the second thickness is at least about 300% greater than or equal to the first thickness.

In one aspect, the chromatographic column is a microgas chromatographic column.

In one aspect, the stationary phase comprises a siloxane polymer comprising at least one alkyl group or aryl group comprising 1 to 30 carbon atoms.

In one aspect, a cross-sectional shape of the chromatographic column is selected from the group consisting of: circular, oval, rectangular, and triangular.

The present disclosure also relates to a method of verifying peak focusing in a gas chromatography device. The method comprises conducting a forward operation by introducing two or more target analytes into an inlet of a chromatographic column comprising a stationary phase deposited inside the chromatographic column and having a positive thickness gradient.

The stationary phase extends from the inlet to the outlet and has a first thickness at the inlet of the chromatographic column and a second thickness at the outlet of the chromatographic column. The second thickness is at least about 10% greater than the first thickness. The forward operation includes separating the two or more target analytes in the chromatographic column and eluting the two or more target analytes from the outlet of the chromatographic column. The method also comprises conducting a reverse operation by introducing the two or more target analytes into the outlet of the chromatographic column comprising the stationary phase. The reverse operation includes separating the two or more target analytes in the chromatographic column and eluting the two or more target analytes from the inlet of the chromatographic column. The method further includes comparing chromatographic resolutions from the forward operation and the reverse operation, wherein the peak focusing rate for at least one corresponding pair of two peaks from two target analytes is greater than 5%.

The present disclosure also further relates to a method of creating a gas chromatography device having a chromatographic column with a positive thickness gradient. The method comprises introducing a precursor liquid into the chromatographic column. The precursor liquid comprises a stationary phase precursor and a low boiling point solvent that volatilizes along a length of the chromatographic column to increase the concentration of the stationary phase precursor when it moves along the column and hence generating the stationary phase thickness gradient. The method also includes reacting or cross-linking the stationary phase precursor to form the positive thickness gradient stationary phase extending from the inlet to the outlet and having a first thickness at the inlet of the chromatographic column and a second thickness at the outlet of the chromatographic column. The second thickness is at least about 10% greater than the first thickness.

In one aspect, prior to introducing the precursor liquid, silanizing an interior surface of the chromatographic column.

In one aspect, the silanizing comprises passing a reactive silane in a gas phase through the column.

In one aspect, the chromatographic column comprises an inlet and an outlet and the introducing and reacting or cross-linking comprises dynamically coating an interior surface of the chromatographic column by partial filling the chromatographic column with the precursor liquid, applying a pressure at the inlet to force the precursor liquid down a length of the column, and applying a vacuum to the outlet to vaporize the low boiling point solvent.

In one aspect, the first thickness is greater than or equal to about 10 nm to less than or equal to about 10 micrometers and the second thickness is greater than or equal to about 30 nm to less than or equal to about 30 micrometers.

In one aspect, the second thickness is at least about 100% greater than or equal to the first thickness.

In one aspect, the second thickness is at least about 300% greater than or equal to the first thickness.

In one aspect, the chromatographic column is a microgas chromatographic column.

In one aspect, the stationary phase comprises a siloxane polymer.

In one further aspect, the siloxane polymer comprises at least one alkyl group or aryl group comprising 1 to 30 carbon atoms.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3A:
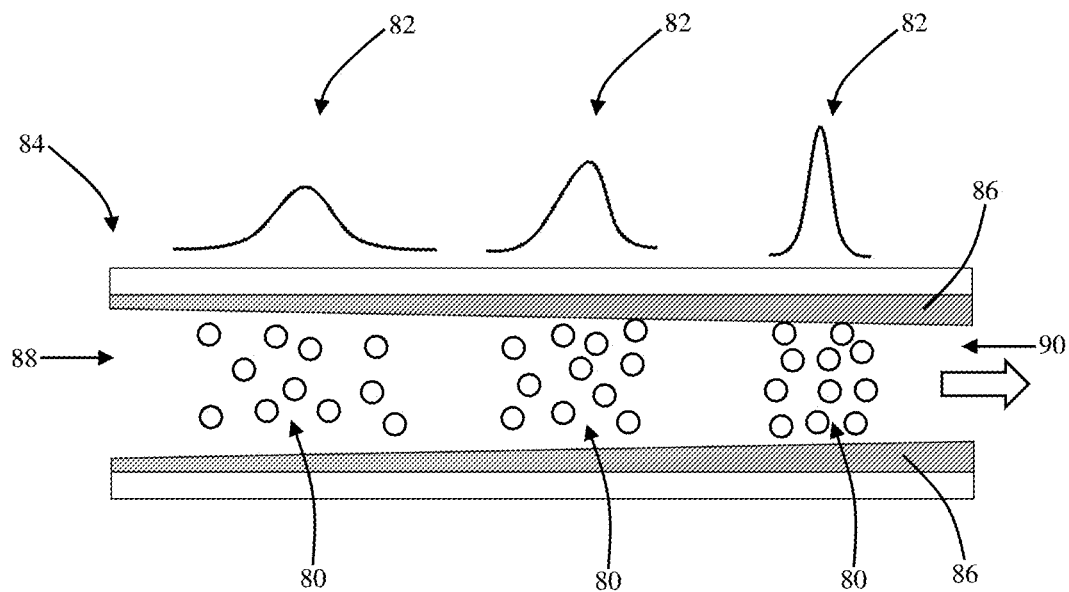
Figure 3B:
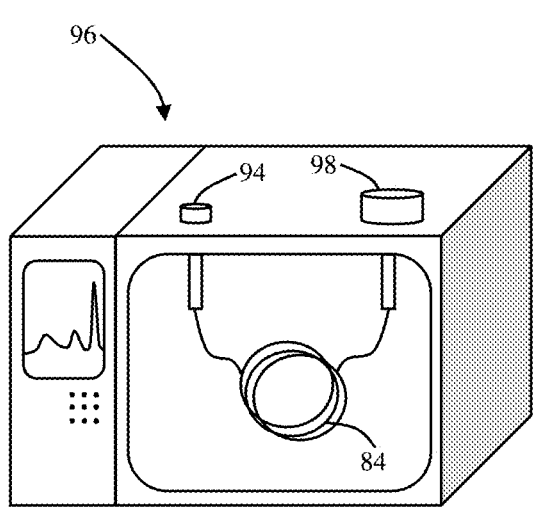
Figure 3C:
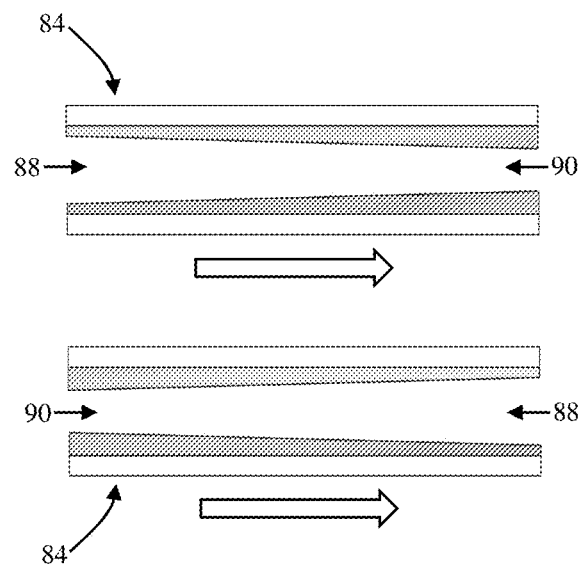

FIGS. 3A-3C are depictions of peak focusing by film thickness gradient column (FTGC) according to certain aspects of the present disclosure. A thinner to thicker film focuses an analyte peak as it travels along the column as shown in FIG. 3A. FIG. 3B is an illustration of a setup for column performance evaluation. FIG. 3C is an illustration of forward and backward/reverse operation modes.

Figure 4A:
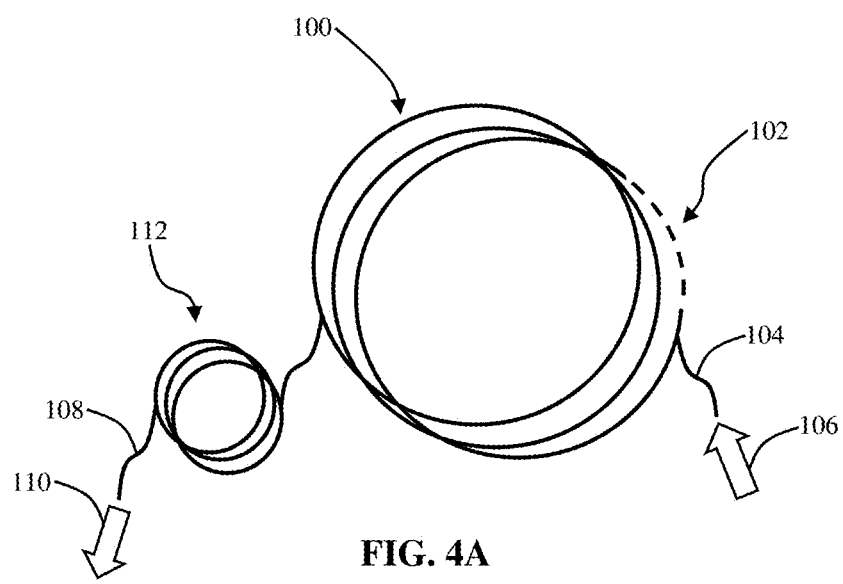
Figure 4B:
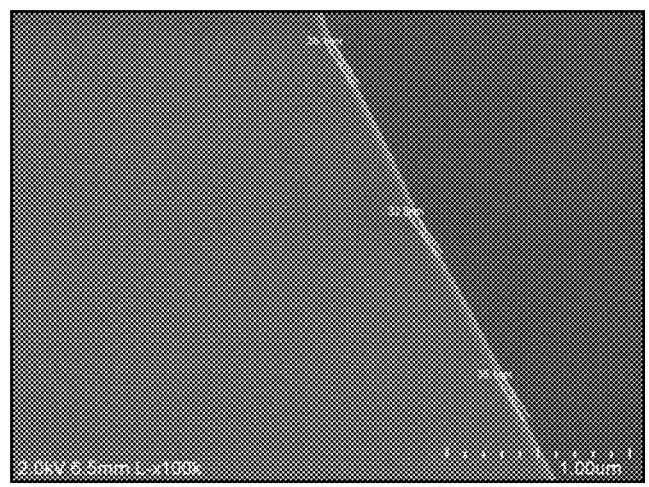
Figure 4C:
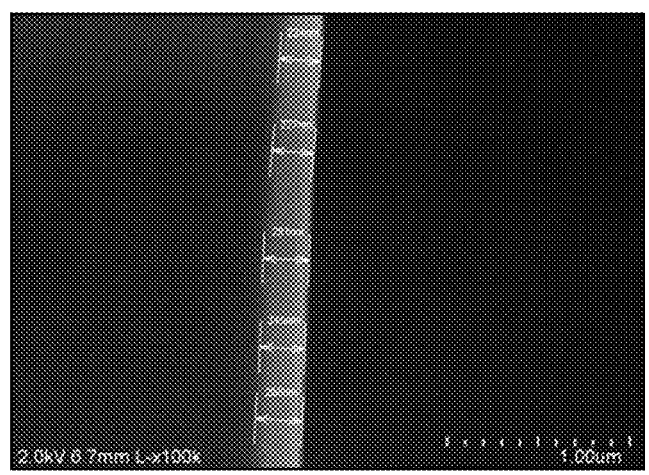

FIGS. 4A-4C. FIG. 4A is an illustration of FTGC coating setup. The column is dynamically coated by partially filling with a coating solution plug and subsequently pushing the mixture out with a pressure of 5 psi. While pushing the solution out, a vacuum pressure of −2 psi was applied to the outlet to vaporize the solvent. FIG. 4B is an SEM image close to the column inlet with a film thickness of 34 nm. FIG. 4C is an SEM image close to the column outlet with a film thickness of 241 nm.

Figure 5A:
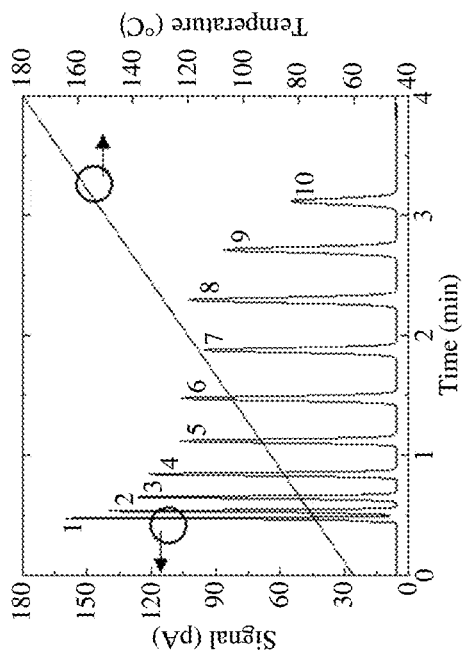
Figure 5B:
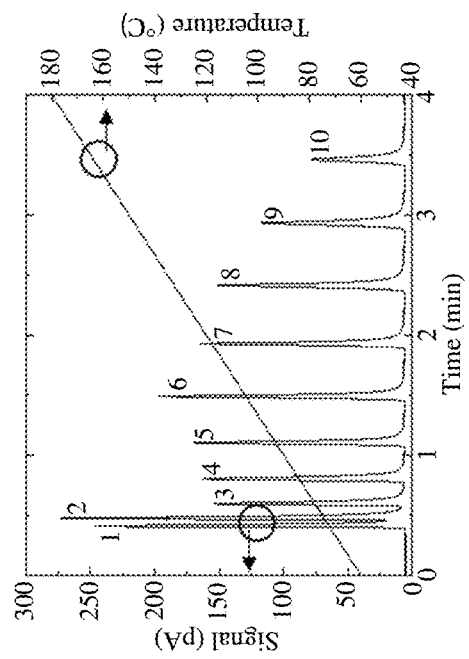
Figure 5C:
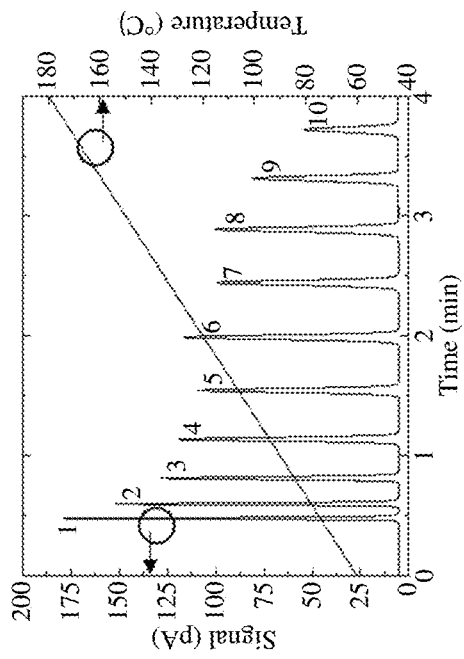
Figure 5D:
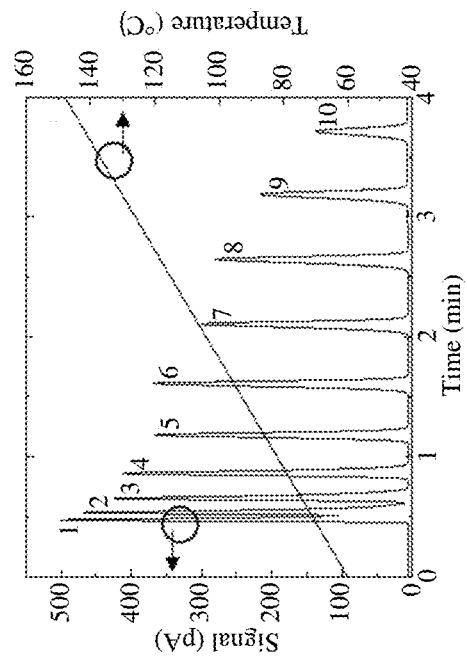

FIGS. 5A-5D. FIG. 5A is a graph of separation of a $C_7$ to $C_{16}$ alkane mixture in forward operational mode. FIG. 5B is a graph of separation of a $C_7$ to $C_{16}$ alkane mixture in identical parameters backward or reverse operational mode. FIG. 5C is a graph of separation of a $C_7$ to $C_{16}$ alkane mixture is equal time backward mode. FIG. 5D is a graph of separation of a $C_7$ to $C_{16}$ alkane mixture using uniform thickness column.

Figure 6:
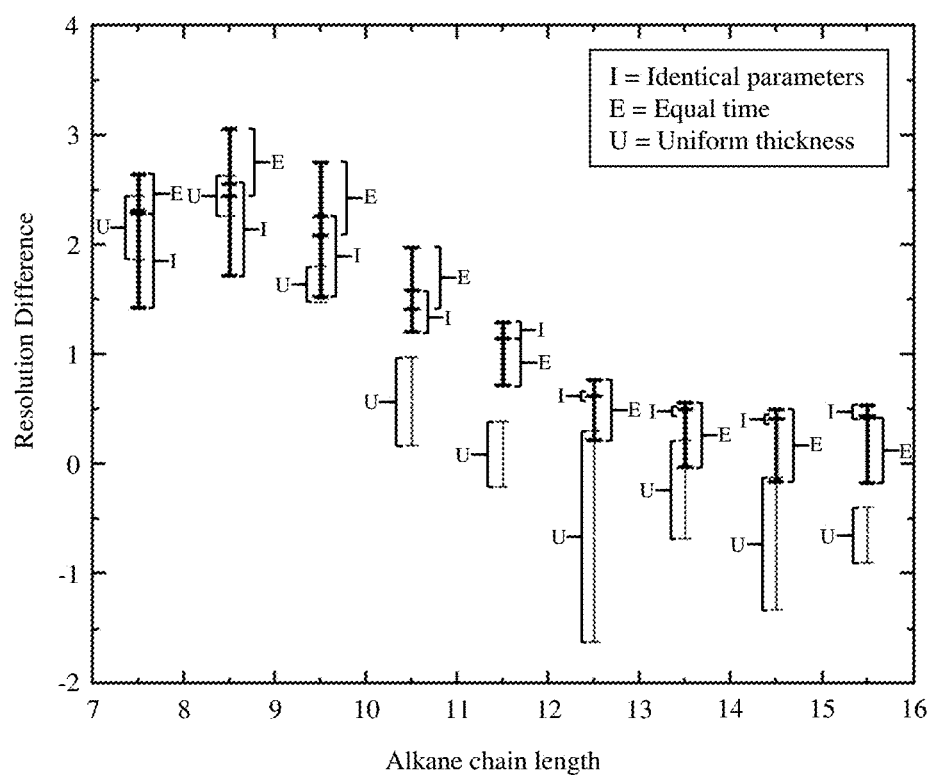

FIG. 6 graphs the resolution differences between forward and identical parameters and equal time reverse/backward modes and a uniform thickness column for $C_7$ to $C_{16}$ alkanes.

Figure 7A:
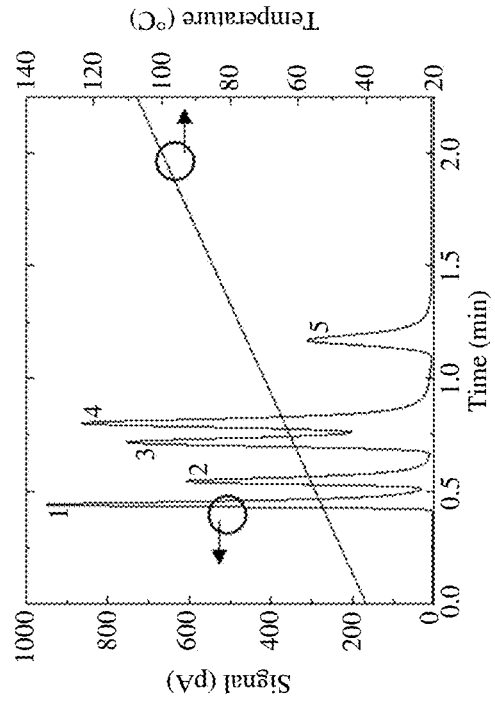
Figure 7B:
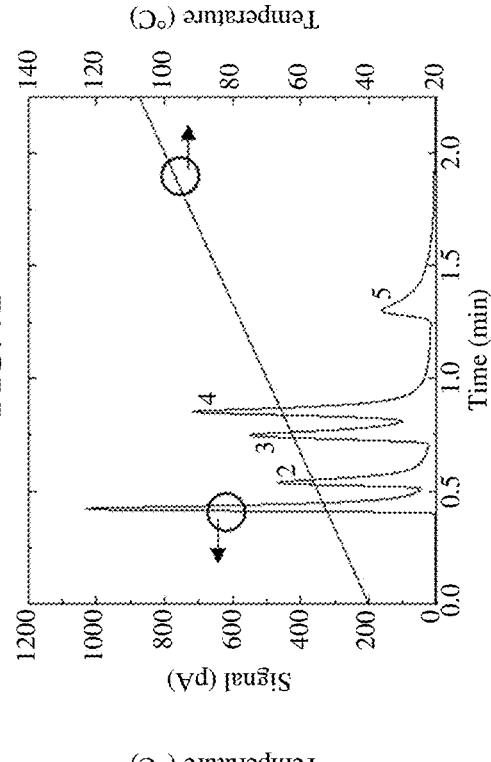
Figure 7C:
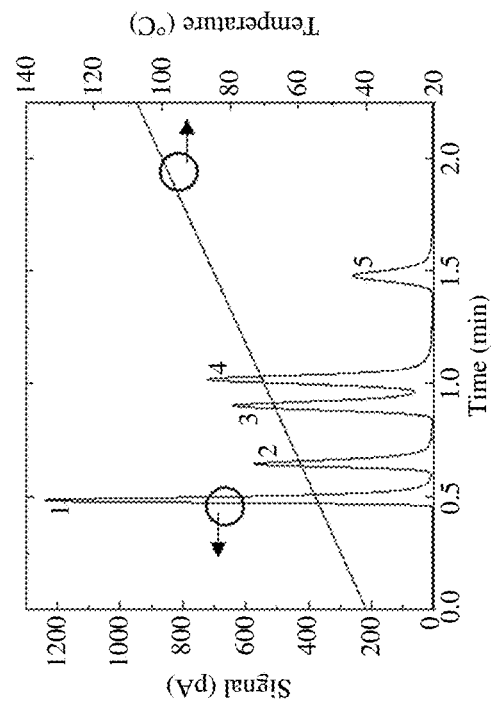
Figure 7D:
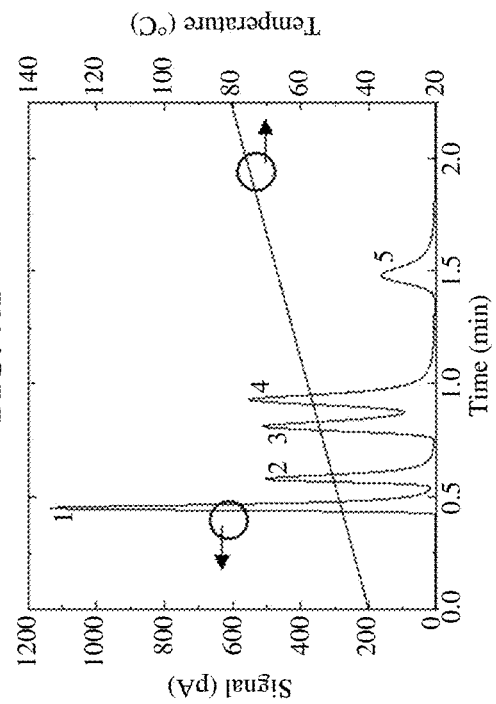

FIGS. 7A-7D. FIG. 7A is a graph of separation of an aromatics mixture in forward mode. FIG. 7B is a graph of separation of an aromatics mixture in identical parameters. FIG. 7C is a graph of separation of an aromatics mixture in equal time backward/reverse model. FIG. 7D is a graph of separation of an aromatics mixture in a comparative column having a uniform thickness column. Peaks 1, 2, 3, 4, and 5 correspond to benzene, toluene, ethylbenzene, o-xylene, and 1,3-dichlorobenzene, respectively.

Figure 8:
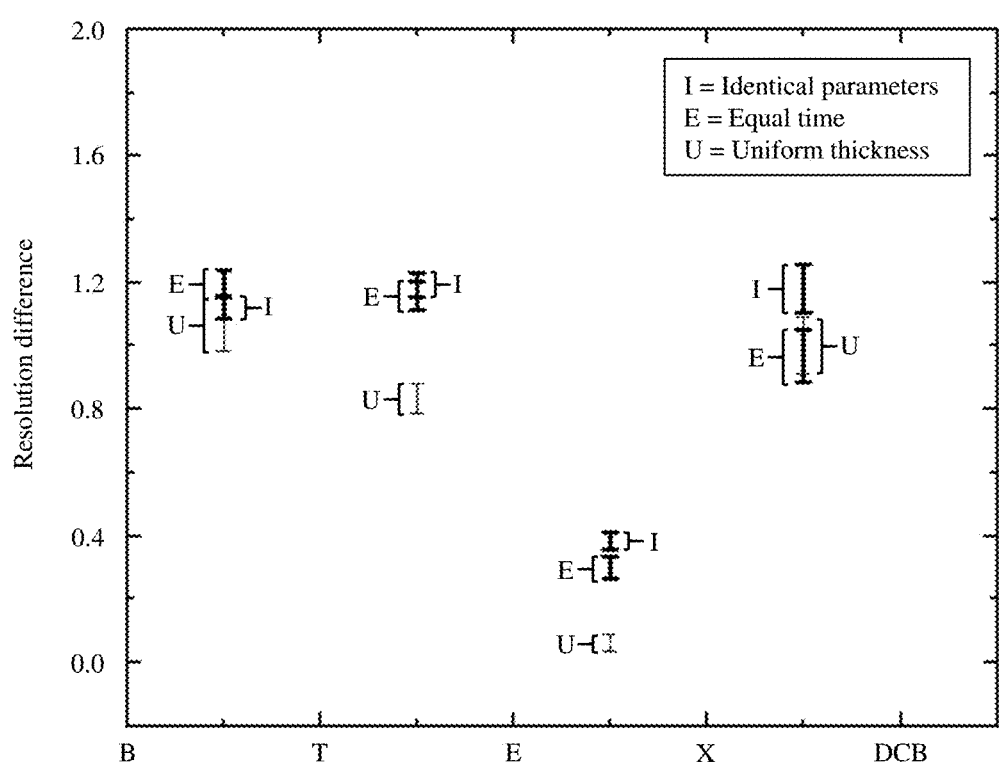

FIG. 8 graphs the resolution differences between forward and identical parameter and equal time backward modes, and a uniform thickness column for aromatics separation.

Figure 9C:
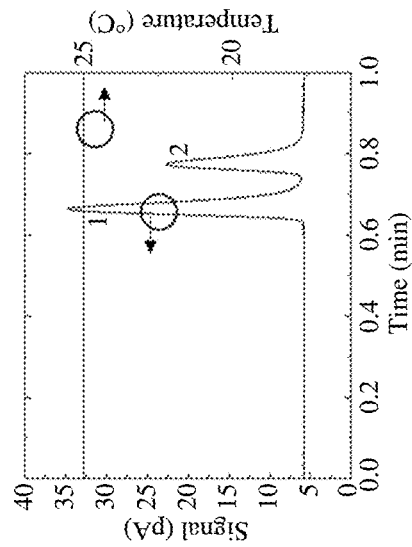
Figure 9B:
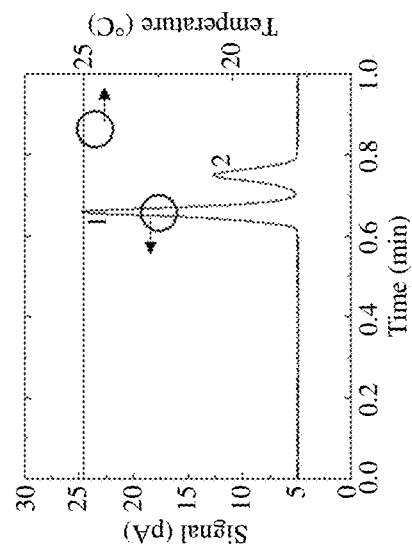
Figure 9A:
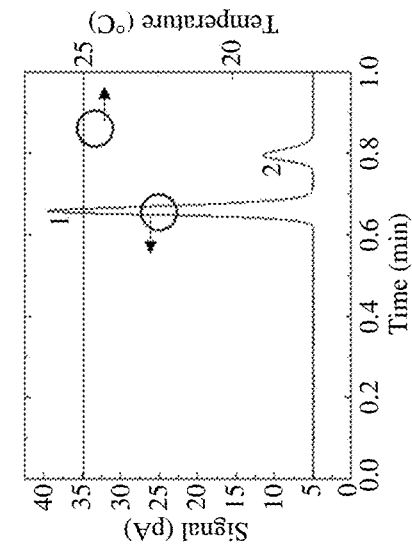

FIGS. 9A-9C. FIG. 9A is a graph of room temperature isothermal separation of $C_5$ and $C_6$ in forward mode. FIG. 9B is a graph of room temperature isothermal separation of $C_5$ and $C_6$ identical parathion reverse/backward mode. FIG. 9C is a graph of room temperature isothermal separation of $C_5$ and $C_6$ using a uniform thickness column.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
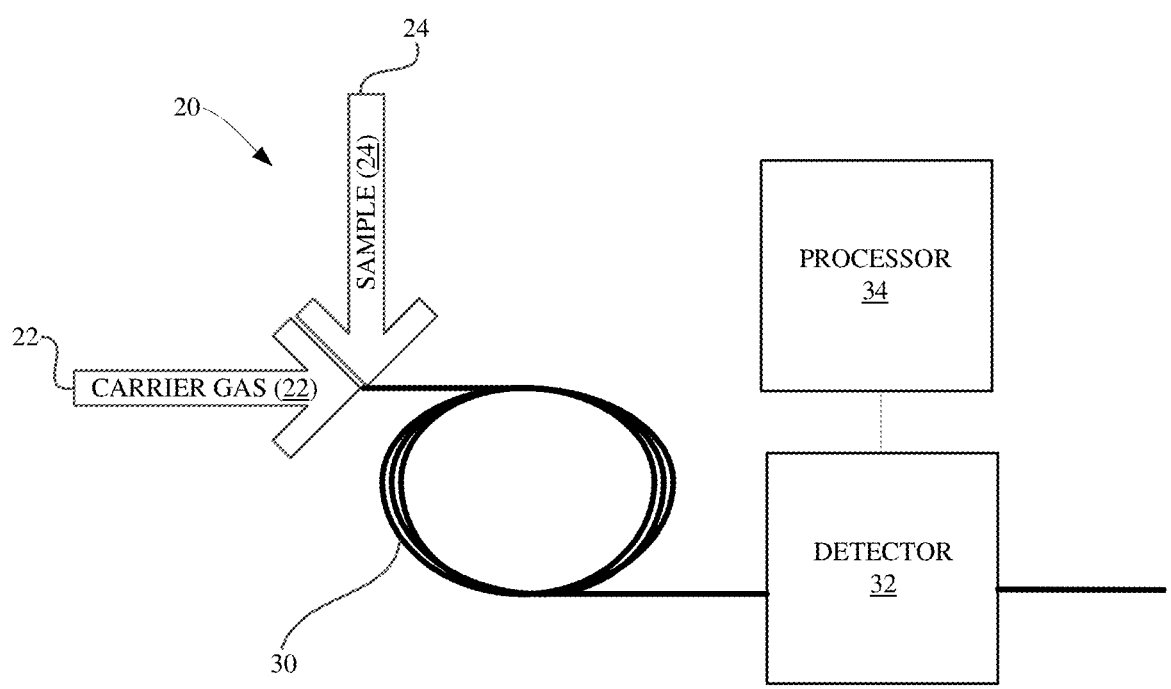
FIG. 1 shows an example embodiment of a gas chromatography device system.

In various aspects, the present teachings pertain to gas chromatography. As shown in FIG. 1, a simplified depiction of a gas chromatography system 20 typically has at least five components: (1) a carrier gas supply 20; (2) a sample injection system 22; (3) one or more gas chromatography columns 30; (4) a detector 32; and (5) a data processing system 34. A carrier gas introduced as carrier gas supply 20 (also referred to as a mobile phase) is a high-purity and relatively inert gas, such as helium, hydrogen, nitrogen, argon, or air. The carrier gas 20 in a conventional system flows through the column 30 at the same time as the sample fluid to be tested (throughout the separating process). The sample injector 22 introduces a predetermined volume of the sample mixture comprising one or more target analytes to be tested (e.g., in gaseous form) into the column 30 by combining it with the flowing carrier gas from a carrier gas supply 20. Thus, a carrier gas supply 20 and a sample 22 (potentially having one or more target analytes) are introduced into one or more chromatography columns 30. The sample 22 moves through with co-injected carrier gas from carrier gas supply 20.

The target analyte species from the sample 24 is separated and transported through column 30 and thus eluted therefrom. It is noted that the eluted sample having one or more target analytes may be eluted from the column 30 in partial fractions, depending on the delay of the respective target analyte species as they are passed through and separated by the chromatographic column 30. Further, the sample fractions that elute from the column 30 may be optionally trapped and re-injected downstream.

Typically, separation is achieved within a chromatographic column 30 because the inside surfaces of a column are coated (or the interior of the column is filled) with a material that serves as a stationary phase. The use of the term "column" is intended to broadly include various flow paths through which fluids may flow, such as a patterned flow field from micro-features defined in one or more substrates or other fluid flow paths recognized by those of skill in the art. The stationary phase adsorbs different target analytes in the sample mixture to differing degrees. The differences in adsorption cause differing delays and thus mobility rates for the different chemical species as they travel down the column, thereby effecting a physical separation of the target analytes in the sample mixture. In certain variations, the chromatographic column is a microgas chromatographic column. As used herein, "microscale" refers to a structure having at least one dimension that is less than about 500 µm, optionally less than about 400 µm, optionally less than about 300 µm, optionally less than about 200 µm, optionally less than about 150 µm, and in certain variations, optionally less than about 100 µm, which may encompass nanoscale features, as well. As used herein, reference to a microscale, microchannel, microfluidic channel, or microstructure, encompasses smaller structures, such as the equivalent nanoscale structures. It should also be noted that while one dimension, such as diameter, may fall within the microscale range, other dimensions, such as length may exceed the microscale range.

The various separated components are eluted from the column 30 to enter one or more detectors 32 for analysis. Thus, one or more detectors 32 are located at the end of one or more columns 30. The detector 32 thus serves to detect the various chemicals or target analytes in the sample emerging or eluting from the column 30 at different times. Such a detector 32 typically operates in the gas chromatography system by destructive analysis of the eluted fractions. Typical non-limiting examples of detectors 32 include a mass spectrometer (MS) (e.g., a time-of-flight mass spectrometer (TOFMS)), a flame ionization detector (FID), photoionization detector (PID), an electron capture detector (ECD), thermal conductivity detectors (TCDs), or the like. A data processing system 34 is also typically in communication with the detector 32, so as to typically be able to store, process, and record the separation test results.

In wall-coated capillary chromatographic columns, vapor interactions between the gas phase and a stationary phase coated on a capillary wall allow for retention of analytes. As analytes travel along the column, they encounter longitudinal and transverse mass transfer, which results in peak broadening, decreasing GC resolution and increasing the possibility of co-elution. Typically, proper selection of the stationary phase within the chromatographic column (to allow for sufficient analyte interaction and retention), application of temperature-programmed profiles, and split/splitless sample injection allow for improvement of chromatograph separation and resolution. In some cases, however, these methods are insufficient to achieve a desired separation. For example, in portable GC, limited carrier gas supplies prevent use of split injections, while fine control over temperature programming is both difficult and limited by system power capacity. Furthermore, even for specialized separations (e.g., separation of highly volatile compounds by porous layer open tubular columns), it can be difficult to fully separate the complete range of relevant compounds. An additional method for improving column separation is therefore desirable.

Negative temperature gradient separation (NTGS) is one method that has been used to improve column performance by sharpening elution peaks. In NTGS, the column inlet is heated, and a temperature gradient is generated via thermal exchange with the ambient environment. Since the temperature is lower toward the column outlet, the peak front travels more slowly than its tail, resulting in overall peak focusing. This effect can be optimized by tuning different temperature profiles along the column, allowing for high versatility under different conditions. However, due to NTGS reliance on thermal exchange, focusing varies with ambient temperature, humidity, air convection rate, and packing material thermal conductivity, reducing repeatability and predictability (especially if complex temperature profiles are used). Sophisticated heat control modules can be used to stabilize the temperature gradient, but add additional size, weight, complexity, and cost to the GC device. Additionally, energy loss due to the aforementioned thermal exchange is a relevant detriment for systems with limited resources (e.g., micro GC devices). Furthermore, separation of high volatility compounds often requires near ambient temperatures, so that generation of a temperature gradient would be avoided or minimized and thus would inhibit the NTGS effect. Therefore, although versatile and tunable, NTGS usage for certain applications (e.g., portable GC) may be limited and challenging.

The present disclosure provide a new method for peak focusing during gas chromatography. In certain aspects, a gas chromatography device for peak focusing of one or more target analytes includes a chromatographic column with an inlet and an outlet. The inlet receives a sample comprising one or more target analytes that exits the column at the outlet. A stationary phase is disposed or deposited inside the chromatographic column and has a positive thickness gradient. The stationary phase extends from the inlet to the outlet and has a first thickness at the inlet of the chromatographic column and a second thickness at the outlet of the chromatographic column. As will be described further below, wherein the second thickness is at least about 10% greater than the first thickness. In this manner, a positive stationary phase thickness gradient is one where the stationary phase film thickness increases from the inlet towards the outlet. With the increased stationary phase thickness toward the outlet, the peak front travels more slowly than its tail, resulting in overall peak focusing.

Figure 2:
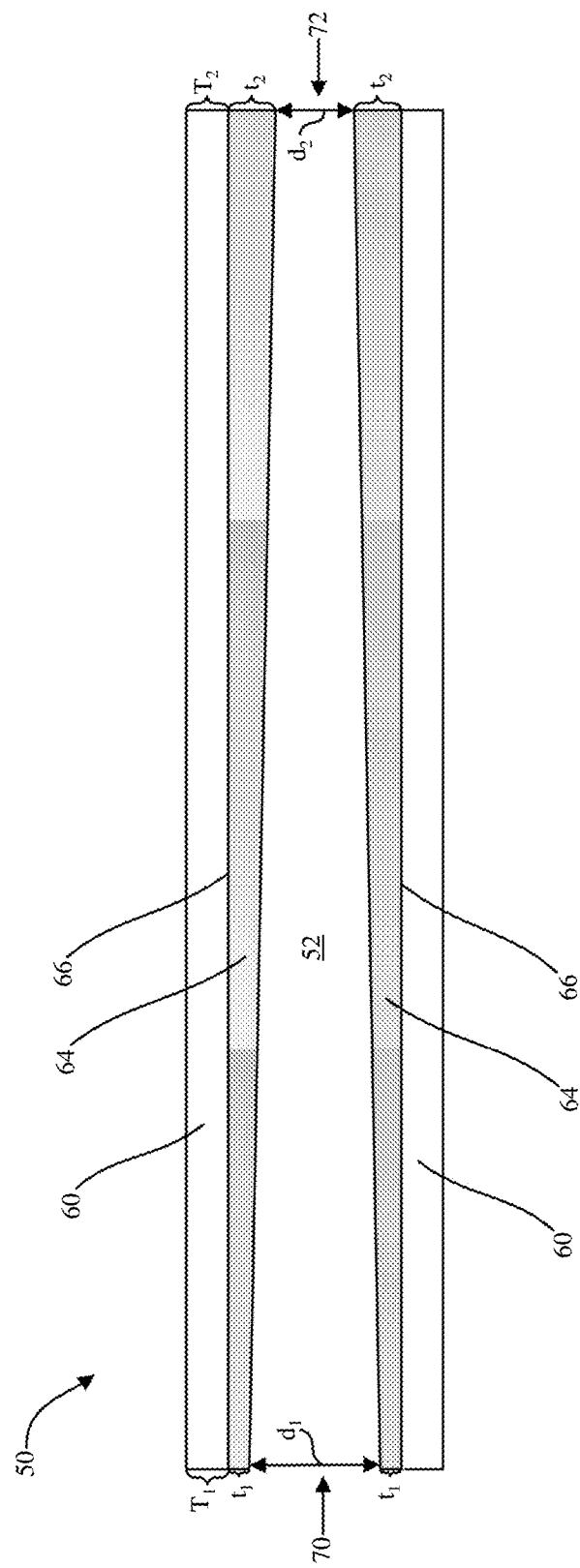
FIG. 2 shows a cross-sectional view of a chromatographic column having a stationary phase with a positive thickness gradient to enhance peak focusing according to certain aspects of the present disclosure.

FIG. 2 shows an example of a chromatographic column 50 prepared in accordance with certain aspects of the present disclosure, which enables peak focusing of one or more target analytes. In certain aspects, the one or more target analytes may be volatile organic compounds (VOCs) that have a relatively high vapor pressure and thus low boiling point at the temperatures and pressures used within the chromatographic column 50. The VOC target analytes may include alkanes or aromatic compounds.

The chromatographic column 50 is defined by a wall 60. The wall 60 of the chromatographic column 50 may thus define a structure having a hollow interior region 52 that may be occupied at least in part by a stationary phase 64. A cross-sectional shape of the chromatographic column 50 may be selected from the group consisting of: circular, oval, rectangular, and triangular. In certain aspects, the chromatographic column 50 is formed of a metal, silica or glass, or a polymer. The chromatographic column 50 defines an inlet 70 and an outlet 72. As shown in FIG. 2, the wall 60 has a constant thickness. Thus, a first thickness of the wall 60 at inlet 70 designated "$T_1$" is the same as a second thickness designated "$T_2$" at the outlet 72.

As noted above, the mixture of one or more target compounds in the sample/carrier mobile phase interact with the stationary phase 64 as they pass through the column. Each target analyte interacts with the stationary phase 64 to a different extent or at a different rate. The analyte that interacts the least with the stationary phase 64 will exit or elute from the chromatographic column 50 first. Generally, the target analytes that interact the most with the stationary phase 64 travel through the column 50 at the slowest rate and thus exit last. By changing characteristics of the mobile phase (carrier and sample) and the stationary phase 65, different mixtures of target analytes can be separated. As will be described below, the stationary phase 64 in the context of the present technology has a positive thickness gradient that enables peak focusing of the one or more target analytes, generally meaning that an analyte peak is focused as it travels from the inlet 70 to the outlet 72 of the chromatographic column 50.

In certain variations, the stationary phase 64 may comprise silicon, such as a silica or a siloxane polymer. A variety of siloxane-based polymers may form the stationary phase 64. Generally, a siloxane polymer is a cross-linked polymer that has a basic backbone of silicon and oxygen with side constituent groups that may be the same or different, generally described by the structural repeating unit (—O—SiRR'—)$_n$, where R and R' may be the same or different side groups and "n" may be any value above 2. Surface functionalization of silica or siloxane can be performed in a monomeric or a polymeric reaction with different short-chain organosilanes to react with silanol groups. While the retention mechanism with target analytes remains the same, differences in the surface chemistries of different stationary phases will lead to changes in selectivity for different target analytes. Siloxane polymers may include polyheterosiloxanes, where side groups or repeating units may be different. Examples of suitable side groups may be at least one unsubstituted or substituted alkyl group or aryl group comprising 1 to 30 carbon atoms, for example, including without limitation: methyl, ethyl, propyl, butyl, pentyl, hexyl, heptyl, octyl, nonyl, decyl, phenyl, alkylphenyl, and the like.

In various aspects, the stationary phase 64 is deposited on an interior surface 66 of the wall 60 and defines a positive thickness gradient. In certain variations, as will be described further below, the interior surface 66 may first be silanized, for example, exposing the interior surface 66 to hexamethyldisilazane (HMDS) vapor to form a silane- or silanol-containing surface coating. Then, a precursor of the siloxane polymer, such as Silicone OV-1, a vinyl modified—100% dimethylsilicone commercially available from Ohio Valley Specialty Company as OV-1 6001 or Silicone OV-17, a vinyl modified—50% phenyl silicone—50% methylsilicone commercially available from Ohio Valley Specialty Company as OV-1 6017 can be injected and reacted to form the stationary phase. A crosslinking agent may also be added with the precursor to facilitate cross-linking, such as Dow SYLGARD™ 184 reagent B (15% w/w, crosslinker). Notably, the stationary phase 64 is not limited to such materials and these are merely provided as suitable examples for a gas chromatography column.

As shown, the stationary phase 64 extends along the interior surface 66 of the wall 60 from the inlet 70 to the outlet 72. The stationary phase 64 thus forms a continuous coating or film on the interior surface 66. The stationary phase 64 has a first thickness designated by "$t_1$" at the inlet 70. The stationary phase 64 also defines a second thickness designated by "$t_2$" at the outlet 72. The second thickness ($t_2$) is at least about 10% greater than the first thickness ($t_1$). As such, the stationary phase 64 defines a positive gradient thickness along the length of the chromatographic column 50. In this manner, the interior region 52 has a first diameter "$d_1$" defined by the first thickness ($t_1$) of the stationary phase 64 at the inlet 70. The interior region 52 has a second diameter "$d_2$" defined by the second thickness ($t_2$) of the stationary phase 64 at the outlet 72. The first diameter ($d_1$) is greater than the second diameter ($d_2$). In this manner, the stationary phase 64 defines a positive thickness gradient within the chromatographic column 50.

In certain aspects, the thickness gradient gradually increases along the length of the chromatographic column 50 between the first thickness ($t_1$) and the second thickness ($t_2$). A change in thickness of the stationary phase 64 may be constant or vary along the length of the chromatographic column 50, but the thickness increases from the inlet 70 to the outlet 72.

In certain variations, the second thickness ($t_2$) is at least about 50% greater than the first thickness ($t_1$), optionally at least about 100% greater than the first thickness ($t_1$), optionally at least about 150% greater than the first thickness ($t_1$), optionally at least about 200% greater than the first thickness ($t_1$), optionally at least about 250% greater than the first thickness ($t_1$), and in certain variations, optionally the second thickness ($t_2$) is at least about 300% greater than the first thickness ($t_1$). The first thickness ($t_1$) optionally may be greater than or equal to about 10 nm to less than or equal to about 10 micrometers and the second thickness ($t_2$) is greater than or equal to about 30 nm to less than or equal to about 30 micrometers. In one variation, the first thickness ($t_1$) is about 30 nm and the second thickness ($t_2$) is about 30 micrometers.

FIGS. 3A-3C are depictions of peak focusing by employing a positive film thickness gradient, also referred to herein as a film thickness gradient column (FTGC) according to certain aspects of the present disclosure. As can be seen in FIG. 3A, for a given analyte 80, a peak 82 becomes more and more focused as the analyte 80 travels down a column 84 having a stationary phase 86 with a positive thickness gradient extending from an inlet 88 to an outlet 90 of the column 84. A thinner to thicker stationary phase 86 film thickness (in a direction from the inlet 88 to the outlet 90) thus focuses the analyte peak 82 as it travels along the column in the direction of the block arrow, as shown in FIG. 3A. FIG. 3B is an illustration of a setup for column performance evaluation. The column 84 is installed in fluid communication with an injector 94 of an Agilent 6890 benchtop GC 96 equipped with a flame ionization detector (FID) 98. FIG. 3C is an illustration of forward (top) and backward/reverse (bottom) operation modes. In other words, the sample containing at least two target analytes is introduced in a forward mode (top) from the inlet 88 and it travels towards the outlet 90 of the chromatographic column 84 in the direction of the block arrow. In the backward or reverse mode (bottom), the sample containing at least two target analytes is introduced to the outlet 90 of the chromatographic column 84 and then travels towards the inlet 88 in the direction of the block arrow.

In certain aspects, the present disclosure contemplates a method of peak focusing in a gas chromatography device. The method may comprise introducing two or more target analytes into an inlet of a chromatographic column comprising a stationary phase deposited inside the chromatographic column and having a positive thickness gradient. The stationary phase extends from the inlet to the outlet and has a first thickness at the inlet of the chromatographic column and a second thickness at the outlet of the chromatographic column. The second thickness is at least about 10% greater than the first thickness. The stationary phase may be any of those described previously above. The method includes separating two or more target analytes in the chromatographic column. Further, the two or more target analytes are then eluted from the outlet of the chromatographic column.

In certain aspects, the two or more target analytes are volatile organic compounds (VOCs). In one aspect, at least one of the two or more target analytes comprises an aromatic compound and an overall peak focusing rate for the aromatic compound is greater than or equal to about 25%, for example, may be greater than or equal to about 26%, optionally greater than or equal to about 27%, and in certain variations, optionally greater than or equal to about 28%.

In another aspect, at least one of the two or more target analytes comprises an alkane compound and an overall peak focusing rate for the alkane compound is greater than or equal to about 10% and in certain aspects, optionally greater than or equal to about 11%.

In yet other aspects, the present disclosure contemplates a method of verifying peak focusing in a gas chromatography device. The method comprises conducting a forward operation by introducing two or more target analytes into an inlet of a chromatographic column comprising a stationary phase deposited inside the chromatographic column and having a positive thickness gradient. The stationary phase extends from the inlet to the outlet and has a first thickness at the inlet of the chromatographic column and a second thickness at the outlet of the chromatographic column, wherein the second thickness is at least about 10% greater than the first thickness. The stationary phase may have any of the designs and compositions previously described above. The forward operation includes separating the two or more target analytes in the chromatographic column, followed by eluting the two or more target analytes from the outlet of the chromatographic column. Then, a reverse operation is conducted by introducing the two or more target analytes into the outlet of the chromatographic column comprising the stationary phase. The reverse operation further includes separating the two or more target analytes in the chromatographic column and eluting the two or more target analytes from the inlet of the chromatographic column. The method further includes comparing chromatographic resolutions from the forward operation and the reverse operation, wherein the peak focusing rate for at least one corresponding pair of two peaks from two target analytes is greater than 5% and optionally greater than or equal to about 10%.

The present disclosure also contemplates a method of creating a gas chromatography device having a chromatographic column with a positive thickness gradient. The method comprises introducing a precursor liquid into the chromatographic column. The precursor liquid comprises a stationary phase precursor and a low boiling point solvent that volatilizes along a length of the chromatographic column to increase the concentration of the stationary phase precursor when it moves along the column and hence generating the stationary phase thickness gradient. The method also includes reacting or cross-linking the stationary phase precursor to form the positive thickness gradient stationary phase extending from the inlet to the outlet and having a first thickness at the inlet of the chromatographic column and a second thickness at the outlet of the chromatographic column. The second thickness is at least about 10% greater than the first thickness.

In certain aspects, prior to introducing the precursor liquid, silanizing an interior surface of the chromatographic column. The silanizing may comprise passing a reactive silane in a gas phase through the column. In one example, the reactive silane may be hexamethyldisilazane (HMDS) vapor that forms a silane-containing surface coating on the interior surface. In certain variations, the reactive silane may be passed through the chromatographic column multiple times.

A precursor of the siloxane polymer, such as Silicone OV-1, a vinyl modified—100% dimethylsilicone commercially available from Ohio Valley Specialty Company as OV-1 6001 or Silicone OV-17, a vinyl modified—50% phenyl silicone—50% methylsilicone commercially available from Ohio Valley Specialty Company as OV-1 6017 can be injected and reacted to form the stationary phase. A crosslinking agent may also be added with the precursor to facilitate cross-linking, such as Dow SYLGARD™ 184 reagent B (15% w/w, crosslinker). Notably, the stationary phase is not limited to such materials and these are merely provided as suitable examples for a gas chromatography column.

The chromatographic column comprises an inlet and an outlet and the introducing and reacting or cross-linking may include dynamically coating an interior surface of the chromatographic column. This can be accomplished by partially filling the chromatographic column with the precursor liquid, applying a pressure at the inlet to force the precursor liquid down a length of the column, and applying a vacuum to the outlet to vaporize the low boiling point solvent. For example, a plug of the precursor liquid can be pushed through the column by applying a pressure of 5 psi at the inlet. A vacuum pressure of −2 psi can be applied to the outlet to vaporize the low boiling point solvent.

EXAMPLES

Stationary phase thickness gradient gas chromatography (GC) columns enables analyte peak focusing and improved separation resolution. Theoretical analysis and simulation demonstrate focusing via a positive thickness gradient, i.e., the stationary phase thickness increases along the column. Peak focusing is experimentally verified by coating a 5 m long capillary column with a film thickness varying from 34 nm at the column inlet to 241 nm at the column outlet. The column is analyzed in forward (thin to thick) and backward (thick to thin) modes and compared to a uniform thickness column with a thickness of 131 nm, using alkanes ranging from C5 to C16 and aromatics.

Comparison of resolutions between forward mode and the uniform thickness column demonstrated an overall focusing rate (i.e., improvement in peak capacity) of 11.7% on alkanes and 28.2% on aromatics.

The focusing effect is also demonstrated for isothermal room temperature separation of highly volatile compounds and temperature programmed separation with different ramping rates. In all cases, peak capacities from forward mode separations are higher than those from other modes, indicating the ability of a positive thickness gradient to focus analyte peaks. This thickness gradient technique can therefore be broadly applied to various stationary phases and column types as a general method for improving GC separation performance.

Test Setup

The FTGC is installed in an Agilent 6890 benchtop GC equipped with a flame ionization detector (FID, see FIG. 3B). Ultra-high purity helium is used as the carrier gas. Evaluation of the peak focusing effect is performed with analytes injected from the thinner coating end (forward mode, i.e., traveling from thinner to thicker film) or thicker coating end (backward mode i.e., traveling from thicker to thinner film), as illustrated in FIG. 3C. A uniform thickness column (film thickness same as the averaged thickness) is also evaluated using the same setup for comparison. All experiments are performed using constant pressure temperature programming. Temperature programing methods and head pressures are provided in Table 1.

Materials

Analytical standard grade $C_5$ to $C_{16}$, benzene, toluene, ethylbenzene, o-xylene, 1,3-dichlorobenzene, nitrobenzene, and dichloromethane are purchased from Sigma-Aldrich (St. Louis, MO). Vinyl modified OV-1 (P/N 6001), and OV-17 (P/N 6017) are purchased from Ohio Valley Specialty Company (Marietta, OH). Dow SYLGARD™ 184 reagent B is purchased from Ellsworth Adhesive (Germantown, WI). Deactivated fused silica tubing (P/N 10010, 250 µm inner diameter) and an RTX-5 column (P/N 10205, cut to 5 m in length with 250 µm inner diameter and 0.1 µm film thickness) are purchased from Restek (Bellefonte, PA). A DB-1MS column (P/N 122-0162, cut to 5 m in length with 250 µm inner diameter and 0.25 µm film thickness) is purchased from Agilent (Santa Clara, CA). All materials are used as purchased without further purification or modification.

Column Coating

OV-1 (75% w/w), OV-17 (10% w/w), and Dow SYLGARD™ 184 reagent B (15% w/w, crosslinker) are dissolved in dichloromethane to create a 2% (w/w) coating solution (effectively a 5% phenyl stationary phase). With reference to FIG. 4A, a 5 m long capillary column (250 µm i.d.) 100 is silanized prior to coating by 8 repeated injections of hexamethyldisilazane (HMDS) vapor. Subsequently, an 80 µL coating solution 102 is loaded into the capillary 100 from a column inlet 104 via a syringe pump. A 5-psi positive pressure 106 is applied from the inlet 104 to drive the coating solution 102 towards an outlet 108. A negative 2-psi vacuum pressure 110 is applied to the outlet 108 through a 1 m dummy column (250 µm i.d.) 112, which ensured a constant coating plug speed. During coating, the small volume of low boiling point dichloromethane evaporated rapidly under vacuum, progressively increasing the coating solution concentration, and hence the film thickness, as the coating solution plug 102 moved from column inlet 104 to outlet 108. After coating, dry air is continuously flowed through the column 100 for 2 hours, followed by crosslinking at 80° C. for another 2 hours and subsequent deactivation using HMDS. The column 100 is then aged at 230° C. for 3 hours under a helium flow of 0.5 mL/min. Using the same method, a column with a uniform thickness film is coated using a 1% (w/w) coating solution (same composition as above, but diluted) and applying a 5-psi positive pressure from the inlet to drive the coating solution toward the outlet (without applying a vacuum).

Simulation Setup

Simulation of separation of $C_8$ to $C_{15}$ in forward and backward modes as well as using a uniform thickness equivalent to the average gradient film thickness is performed (separation conditions in Table 1). The film thickness varied from 34 nm to 241 nm for a 5 m column (inlet to outlet for forward mode and vice versa for backward mode). Note that calculation of retention factor k(x, t) requires a value for distribution coefficient K(t) (Eq. (2)), which is estimated based on known values. Simulated retention times and FWHMs are provided in are provided in Table 2 and resolutions are provided in Table 3.

Uniform Thickness Control

A Restek RTX-5 column is used for separation of C7 to C16 alkanes in forward and backward modes as a control, with no difference in separation expected. The separation conditions are provided in Table 1. p-values for retention times and FWHMs (over 5 runs) are calculated using a paired Student's t-test and converting the resulting T-score to a p-value. Significance is taken at p=0.05; no significant differences between forward and backward modes are observed for any analyte peak. Similarly, no significant differences between forward and backward modes are observed for $C_7$-$C_{15}$ when a 5 m long Agilent DB-1MS column (data not shown) is used.

Stationary Phase Characterization

To characterize the thickness of the stationary phase, the FTGC is first frozen in liquid nitrogen and several pieces are scored off. Scanning electron microscopy (SEM) images are taken close to the column inlet (thinner film) and outlet (thicker film). FIGS. 4(B) and (C) show that the film thickness increases from 34 nm to 241 nm from the inlet to the outlet, a gradient of approximately 41 nm/m. The uniform thickness column is also characterized at both the inlet and outlet with a film thickness of 131 nm at both column ends.

A theoretical explanation for peak focusing is as follows.

The effective velocity, $u_{eff}(x, t)$, of an analyte at a location x (the distance from the column inlet) and a given time t is given by $$u_{eff}(x, t) = \frac{u_M(x, t)}{1 + k(x, t)}, \quad (1)$$

where $u_M(x, t)$ is the velocity of the mobile phase and k(x, t) is the retention factor:

$$k(x, t) = \frac{K(x, t)}{\beta(x)}, \quad (2)$$

with distribution coefficient K(t) defined as $$K(x, t) = \exp\left(\frac{\Delta G}{RT(x, t)}\right). \quad (3)$$

where R is the universal gas constant and T(x, t) is the time dependent column temperature at location x. ΔG is the Gibbs free energy change associated with an analyte moving from the stationary to mobile phase and can be calculated from the change in analyte enthalpy (ΔH) and entropy (ΔS)

$$\Delta G = \Delta H - T \Delta S. \quad (4)$$

The phase ratio β is defined by $$\beta = \frac{(d_i - 2d_f)^2}{d_i^2 - (d_i - 2d_f)^2} \approx \frac{d_i}{4d_f}, \text{ for } d_i \gg d_f \quad (5)$$

where $d_i$ and $d_f$ (x) are the column inner diameter and the film thickness, respectively. Eq. (2) can thus be expressed as $$k(x, t) = A \exp\left(\frac{\Delta G}{RT(x, t)}\right) \times d_f(x), \quad (6)$$

where A is a constant for a given column. The retention factor change along the column, δk(x,t), can be written as $$\frac{\delta k(x, t)/\delta x}{k(x, t)} = -\frac{\Delta H}{RT(x, t)} \frac{\delta T(x, t)/\delta x}{T(x, t)} + \frac{\delta d_f(x)/\delta x}{d_f(x)}. \quad (7)$$

Eq. (7) shows that the fractional increase of the retention factor, δk/k, along the column in distance δx has two contributions: a negative temperature gradient given by the first term and a positive film thickness gradient given by the second term. This retention factor gradient (δk/k) is related to a velocity gradient by Eq. (1); thus, both a negative temperature gradient and a positive film thickness gradient result in a velocity difference between the front and tail of a band, allowing for band focusing (e.g., the spatial distribution of an analyte experiences a spatially varying velocity gradient). At the outlet, the band is observed as a time varying peak during elution, which can be narrower than the corresponding peak from an unfocused band. In other words, peak focusing (an observable quantity) occurs as a result of band focusing within the column. The equivalency of these two gradients can be expressed as $$-\frac{\Delta H}{RT(x, t)} \frac{\delta T(x, t)}{T(x, t)} = \frac{\delta d_f(x)}{d_f(x)}. \quad (8)$$

The film thickness gradient has several advantages over conventional temperature gradient-based peak focusing. First, the film thickness gradient is independent of column temperature, allowing for focusing of analytes of any volatilities at any operation temperatures. High volatility compounds, especially, are difficult to focus with NTGS, but can be accomplished in accordance with the inventive technology (e.g., with an FTGC chromatography device and process). Second, while the temperature gradient may vary with heater and ambient conditions (such as heater arrangement, heat dissipation, column size/weight, column channel arrangement, and ambient temperature and air flow), the film thickness gradient is always constant and allows for more reliable and repeatable GC operation (less susceptible to environmental effects). Finally, the FTGC in accordance with certain aspects of the present disclosure can be used without extra accessories (such as heaters or coolers, which are required for NTGS), which significantly reduces device complexity for future integration. However, despite these advantages, in some aspects, film thickness gradient-based separation may be less versatile than NTGS since the gradient is fixed, whereas a temperature gradient can be adjusted by changing the heat source and/or drain. In addition, the increased film thickness toward the column outlet may result in slower mass transfer, potentially offsetting the peak focusing effect. The mass transfer effect is examined in the following simulation.

For this simulation, no temperature gradient (i.e., NTGS) is considered; only a film thickness gradient is analyzed. The time dependent concentration c of an analyte peak traveling along a column is determined by solving the transient convection-diffusion equation $$\frac{\partial c}{\partial t} = -\frac{\partial}{\partial x}(u_{eff} c) + \frac{\partial}{\partial x}\left(D_{eff} \frac{\partial c}{\partial x}\right). \quad (9)$$

where $u_{eff}$(x, t) is given in Eq. (1). The effective diffusion, $D_{eff}$, can be calculated from local dispersion, D, and the retention factor k(x, t)

$$D_{eff}(x, t) = \frac{D(x, t)}{1 + k(x, t)}, \quad (10)$$

$$D = D_M(x, t) + \frac{1}{2}\left[\frac{1 + 6k(x, t) + 11k(x, t)^2}{24(1 + k(x, t))^2} \frac{d_i^2}{D_M(x, t)} + \frac{2k(x, t)}{3(1 + k(x, t))^2} \frac{d_f(x, t)^2}{D_S(x, t)}\right] u_M(x, t)^2, \quad (11)$$

with $d_f$ as the film thickness and $D_M$ as the mobile phase diffusion constant. Note that D includes both longitudinal and transverse mass transfer/diffusion. $D_M$(x,t) can be expressed as $$D_M(x, t) = D_C \frac{T(t)^{1.75}}{p(x)} = 5 \times 10^4 D_S(x, t), \quad (12)$$

with diffusion constant $D_C$ (dependent on molar weights and atomic and structural diffusion volumes of analytes and mobile phase molecules) and $D_S$ as the stationary phase diffusion constant. Local pressure p(x) is determined from inlet and outlet pressures $p_{in}$ and $p_{out}$ $$p(x) = \sqrt{p_{in}^2 - (p_{in}^2 - p_{out}^2)\frac{x}{L}} \quad (13)$$

with L being the length of the column. $u_M$, the velocity in mobile phase is given by $$u_M(x, t) = \frac{d_i^2}{16\eta(t)L} \frac{1}{p(x)}(p_{in}^2 - p_{out}^2), \quad (14)$$

with viscosity η provided as a function of reference viscosity $\eta_0$ at temperature $T_0$ and gas type dependent exponent $\alpha_n$:

$$\eta(t) = \eta_0 \left(\frac{T(t)}{T_0}\right)^{\alpha_n}. \tag{15}$$

In Eq. (12), note that temperature T (x, t) is provided as T (t) under the assumption that the temperature remains the same along the column at a given time t. Eq. (9) can be solved by applying a finite difference model to discrete time (t) and position (i) vectors $$\frac{\partial c}{\partial t} \to \frac{\partial C}{\partial t} = \frac{C_{i,t+1} - C_{i,t}}{\Delta t} \tag{16}$$

$$\frac{\partial c}{\partial x} \to \frac{\partial C}{\partial x} = \frac{C_{i+1,t} - C_{i,t}}{\Delta x} \tag{17}$$

$$\frac{\partial^2 c}{\partial x^2} \to \frac{\partial^2 C}{\partial x^2} = \frac{C_{i+1,t} - 2C_{i,t} + C_{i-1,t}}{(\Delta x)^2}, \tag{18}$$

with $\Delta x$ and $\Delta t$ being simulation distance and time step sizes. Combining these yields $$C_{i,t+1} = \tag{19}$$
$$C_{i,t} + \Delta t \left(-\mu_{eff}(i,t) \frac{C_{i+1,t} - C_{i,t}}{\Delta x}\right) + \Delta t \left(D_{eff}(i,t) \frac{C_{i+1,t} - 2C_{i,t} + C_{i-1,t}}{(\Delta x)^2}\right).$$

The solution to Eq. (19) produces the time dependent movement of an analyte peak along the column.

To simulate Eq. (19), several boundary conditions must be set. First, at t=0, the injected peak has a Gaussian peak shape, i.e., $$C(x, 0) = \frac{1}{\sigma\sqrt{2\pi}} e^{-\frac{(x-3\sigma)^2}{2\sigma^2}}, \tag{20}$$

where $\sigma$ is the initial dispersion. Note that the initial peak at time t=0 is at x=3$\sigma$. At the column inlet, after the initial injection, no additional analyte is injected into the column:

$$C(0,t)=0. \tag{21}$$

At the column outlet, the last mesh concentration is approximately the same as the one to the left (since it cannot be calculated by equation (16)), i.e., $$C(L,t)=C(L-\Delta x,t). \tag{22}$$

Peak retention times and full widths at half maxima (FWHMs) can be measured at the column outlet (i.e., x=L) by observing that, using Eq. (19), a spatially varying concentration is used to construct a two-dimensional concentration matrix varying with both position and time. For example, separation of $C_8$ to $C_{15}$ compounds may be simulated with positive (i.e., thin to thick, or "forward" mode) and negative (i.e., thick to thin, or "backward" mode) film thickness gradients. Simulation of a uniform thickness (with a thickness equivalent to the average forward/backward mode film thickness) film is also conducted as a control. The temperature is ramped from 40° C. to 240° C. at a rate of 30° C./min. The head pressure is set to 3.45 psi (outlet is set to ambient, i.e., 1 atm). The film thickness is varied from 34 nm to 241 nm for a 5 m column (inlet to outlet for forward mode and vice versa for backward mode. By observing concentration along the second dimension (i.e., in time), a vector of concentration varying with time can be obtained, corresponding to a signal obtained from a detector at the outlet. The maximal value (varying with time) corresponds to the elution/retention time, and FWHMs can be measured by observing the times at which the concentration is half the peak value. Resolutions (R) between adjacent peaks can additionally be calculated using the formula $$R = 1.18 \times \frac{t_2 - t_1}{w_1 + w_2}, \tag{23}$$

where $t_1$ and $t_2$ are the retention times for two peaks and $w_1$ and $w_2$ are the corresponding FWHMs.

Peak retention times and full widths at half maxima (FWHMs) are measured at the column outlet (i.e., x=L) and are provided in Table 1. Table 1 shows temperature programming profiles and head pressures for simulation, uniform thickness control, separation of alkanes $C_7$ to $C_{16}$, separation of aromatics, and separation of high volatility alkanes ($C_5$ and $C_6$).

TABLE 1

|  | Initial Temperature (° C.) | Final Temperature (° C.) | Ramping Rate (° C./min) | Head Pressure (psi, mL/min) |
| --- | --- | --- | --- | --- |
| Simulation | 40 | 240 | 30 | 3.45, N/A |
| Uniform thickness control | 60 | 180 | 30 | 3.45, 2.7 |
| Alkane mixture (forward) | 60 | 180 | 30 | 3.45, 2.7 |
| Alkane mixture (equal time backward) | 60 | 148 | 22 | 3.45, 2.7 |
| Aromatics mixture (forward) | 45 | 105 | 30 | 3.45, 2.9 |
| Aromatics mixture (equal time backward) | 45 | 90 | 20 | 3.45, 2.9 |
| High Volatility Alkanes | 26 | 26 | 0 | 2.20, 2.0 |

Table 2 shows simulated retention times (RTs) and full widths at half maxima (FWHMs) for $C_8$ to $C_{15}$ in forward and backward modes. RTs and FWHMs for a uniform coating thickness are also provided for reference. The temperature is ramped from 40° C. at a rate of 30° C./min with a head pressure of 3.45 psi. Column length is 5 m. All values are provided in minutes. Additional analysis is provided in Table 3.

TABLE 2

|  | $RT_{fwd}$ | $FWHM_{fwd}$ | $RT_{uni}$ | $FWHM_{uni}$ | $RT_{bkwd}$ | $FWHM_{bkwd}$ |
|---|---|---|---|---|---|---|
| $C_8$ | 0.460 | 0.0382 | 0.449 | 0.0519 | 0.439 | 0.0684 |
| $C_9$ | 0.731 | 0.0473 | 0.714 | 0.0704 | 0.697 | 0.0995 |
| $C_{10}$ | 1.157 | 0.0574 | 1.136 | 0.0885 | 1.113 | 0.1296 |
| $C_{11}$ | 1.639 | 0.0656 | 1.615 | 0.1005 | 1.560 | 0.1487 |
| $C_{12}$ | 2.106 | 0.0713 | 2.082 | 0.1073 | 2.055 | 0.1584 |
| $C_{13}$ | 2.591 | 0.0763 | 2.568 | 0.1120 | 2.541 | 0.1640 |
| $C_{14}$ | 3.050 | 0.0807 | 3.027 | 0.1158 | 3.001 | 0.1679 |
| $C_{15}$ | 3.460 | 0.0842 | 3.437 | 0.1186 | 3.411 | 0.1708 |

Table 3 shows simulated resolutions (R) between adjacent peaks for $C_8$ to $C_{15}$ in forward and backward modes and for uniform thickness. Forward mode resolutions are all larger than backward mode and uniform thickness resolutions. The difference in resolution is defined as $R_{diff}=R_{fwd}-R_{bkwd}$.

TABLE 3

|  | Rfwd | Rbkwd | Rdiff | Runi |
|---|---|---|---|---|
| C8/C9 | 3.744 | 1.814 | 1.930 | 2.554 |
| C9/C10 | 4.808 | 2.147 | 2.661 | 3.133 |
| C10/C11 | 4.619 | 2.020 | 2.599 | 2.992 |
| C11/C12 | 4.024 | 1.787 | 2.237 | 2.647 |
| C12/C13 | 3.884 | 1.779 | 2.105 | 2.615 |
| C13/C14 | 3.448 | 1.634 | 1.814 | 2.379 |
| C14/C15 | 2.932 | 1.429 | 1.503 | 2.065 |
| PC | 27.459 | 12.610 | — | 18.385 |

Table 1 shows that analyte peaks in forward and backward modes elute at different times; this is due to the fact that separation conditions for a given analyte are different between the two modes. In forward mode, the analyte is first exposed to the thinner film at low temperatures before reaching the thicker film at high temperatures, exactly opposite of what the analyte experiences in backward mode. As a result, retention times for analytes in these two modes are different and peak full widths at half maxima (FWHMs) are not directly comparable when assessing column performance. Instead, resolution R between two peaks is used to analyze separation performance (see Table 3), which is given by Equation 23.

Table 3 demonstrates that forward mode yields higher resolution between adjacent peaks when compared to backward mode, meaning that in the same time interval, forward mode can contain more peaks than backward mode. Uniform thickness resolutions are larger than backward mode resolutions, but always smaller than forward mode resolutions, thus demonstrating that peak focusing is achieved in forward mode. Further analysis of adjacent peak resolutions shows that the difference in resolutions between forward and backward modes (i.e., $R_{diff}=R_{forward}-R_{backward}$) decreases as analyte retention is increased. This may be due to slower mass transfer (i.e., transverse diffusion)—which is more pronounced for heavier compounds—in the thicker film region. In forward mode, this effect broadens lower volatility compounds closer to the column outlet, offsetting the focusing provided by the column. In contrast, in backward mode, the thinner film at the outlet results in less broadening, which offsets the defocusing from the backward gradient. Thus, for lower volatility compounds, the resolution difference between forward and backward modes is decreased.

Peak focusing on alkane mixture. The FTGC's peak focusing capabilities are evaluated by separation of a $C_7$ to $C_{16}$ alkane mixture. 0.025 μL of liquid is used for injection at a split ratio of 5:1. The same separation conditions are used for forward mode, the uniform thickness column, and backward mode (denoted as "identical parameters backward mode", see Table 1—alkane mixture). Example chromatograms are shown in FIGS. 5A-5D.

FIG. 6 shows that analyte peaks in forward mode, for the uniform thickness column, and in identical parameters backward mode elute at different times, which is consistent with simulation (Table 2). This is due to the fact that separation conditions for a given analyte are different between the two modes, which in turn are different from the uniform thickness column. In forward mode, the analyte is first exposed to the thinner film at low temperatures before reaching the thicker film at high temperatures, exactly opposite of what the analyte experiences in backward mode. In the uniform thickness column, analytes experience the same film thickness at all temperatures. As a result, retention times for analytes in these two modes and in the uniform column are different and peak full widths at half maxima (FWHMs) are not directly comparable when assessing column performance. Instead, resolutions between adjacent peaks (e.g., $C_7$ and $C_8$, $C_8$ and $C_9$, etc.) are used to analyze separation performance. Resolutions in identical parameters backward mode and for the uniform column are subtracted from corresponding resolutions in forward mode; the resolution differences (i.e., $R_{forward}-R_{identical\ parameters\ backward}$ or $R_{forward}-R_{uniform}$) between all adjacent peak pairs (averaged over 5 runs) are plotted in FIG. 6. p-values for resolution difference are calculated using a paired Student's t-test (for 5 runs in forward and identical parameters backward modes and for the uniform column) and converting the resulting T-score to a p-value (see Table 3). Significance is taken at p=0.05, showing that forward mode has significantly higher resolution between all pairs of adjacent peaks when compared to identical parameters backward mode. This is corroborated by simulation (Table 3), which also demonstrates higher resolutions in forward mode, meaning that in the same time interval, forward mode can contain more peaks than backward mode. Uniform thickness column resolutions are lower than forward mode resolutions up to $C_{10}/C_{11}$, but uniform resolution is higher for the $C_{15}/C_{16}$ pair. Analysis of overall performance is provided below.

Table 4 shows p-values between forward mode and uniform thickness, identical parameters (IP) backward, and equal time (ET) backward modes for $C_7$ to $C_{16}$ alkanes separation. Significance is taken at p=0.05. All p-values are significant between forward and IP backward mode, while p-values for $C_7$ to $C_{13}$ are significant for ET backward mode. Forward mode resolutions are significantly higher than uniform thickness resolutions up to $C_{10}/C_{11}$, while uniform thickness resolution is significantly higher for $C_{15}/C_{16}$.

TABLE 4

| Alkane pair | p-values | | |
|---|---|---|---|
|  | IP | ET | Uniform |
| $C_7/C_8$ | 0.001 | 9.77e-6 | 1.20e-4 |
| $C_8/C_9$ | 5.27e-4 | 5.46e-5 | 1.18e-5 |
| $C_9/C_{10}$ | 5.08e-4 | 1.39e-4 | 4.06e-5 |
| $C_{10}/C_{11}$ | 1.27e-4 | 2.79e-4 | 0.046 |
| $C_{11}/C_{12}$ | 7.38e-5 | 9.6e-4 | 0.585 |
| $C_{12}/C_{13}$ | 5.35e-5 | 0.023 | 0.244 |
| $C_{13}/C_{14}$ | 3.28e-6 | 0.146 | 0.358 |
| $C_{14}/C_{15}$ | 2.80e-5 | 0.359 | 0.074 |
| $C_{15}/C_{16}$ | 7.24e-5 | 0.430 | 0.006 |

To further account for the discrepancy between retention times, a second set of chromatograms is obtained by lowering the backward mode ramping rate to ensure that $C_{16}$ (the last eluted analyte) eluted at the same time as in forward mode (this is denoted as "equal time backward mode", see Table 1—separation conditions, FIGS. 5A-5D chromatograms, FIG. 6—resolution differences, Table 4—p-values). Again, forward mode provides significantly higher resolution for alkane pairs between $C_7$ and $C_{13}$ (results obtained from 5 runs), but performs similarly to equal time backward mode for $C_{13}$ to $C_{16}$. While forward mode does not outperform equal time backward mode (or the uniform thickness column) for all local resolutions (i.e., between adjacent alkane pairs), forward mode has a significantly higher peak capacity (PC), defined as the sum over all resolutions (Table 5), compared to all other modes. Analysis of the focusing rate, defined as $$FR = \frac{PC_{forward} - PC_{backward}}{PC_{backward}}, \quad (24)$$

shows that forward mode demonstrates overall focusing rates of approximately 11.7%, 26.8% and 29.8% when compared with the uniform thickness column, identical parameters backward modes and equal time backward mode, respectively.

TABLE 5

| | |
|---|---|
| Forward peak capacity | 49.34 ± 0.841 |
| Backward peak capacity (IP) | 38.90 ± 0.831 |
| p-value (IP) | 1.73e−4 |
| Focusing rate (IP) | 26.84% |
| Backward peak capacity (ET) | 38.02 ± 2.400 |
| p-value (ET) | 4.62e−4 |
| Focusing rate (ET) | 29.76% |
| Uniform peak capacity | 44.18 ± 0.483 |
| p-value (uniform) | 1.63e−4 |
| Focusing rate (uniform) | 11.67% |

Table 5. Peak capacities, Global resolutions, p-values, and focusing rates between forward mode and identical parameters (IP, and equal time (ET) backward modes, and uniform thickness for $C_7$ to $C_{16}$ alkanes separation in FIGS. 5A-5D. Significance is taken at p=0.05. Peak capacity in forward mode is significantly better than peak capacities in all other modes.

Peak Focusing on Aromatics Mixture

FTGC peak focusing is also analyzed on separation of an aromatics mixture containing benzene, toluene, ethylbenzene, o-xylene, and 1,3-dichlorobenzene. 0.025 μL of mixture liquid is injected at a split ratio of 5:1 (separation conditions provided in Table 1—aromatics mixture). Example chromatograms are shown in FIGS. 7A-7D and resolution differences are shown in FIG. 8. Local resolution difference p-values (calculated from 5 runs) are provided in Table 6. Peak capacities, p-values, and focusing rates are provided in Table 7, showing that forward mode has significantly higher peak capacity compared all other modes. Thus, regardless of whether separation parameters are kept constant (and analytes elute faster in identical parameters backward mode) or changed to ensure that the last compound elutes at the same time (in forward and equal time backward modes), separation performance in forward mode is always better than in either backward mode. Forward mode also outperforms the uniform thickness column, demonstrating a focusing rate of 28.2% (Table 7). Thus, overall, forward mode (i.e., a positive film thickness gradient) demonstrates the ability to improve separation peak capacity.

Table 6 shows p-values between forward mode and uniform thickens, identical parameters backward (IP), and equal time backward (ET) modes for aromatics separation. See FIGS. 7A-7D for elution order and abbreviations. Significance is taken at p=0.05. All p-values show significantly improved resolution in forward mode.

TABLE 6

| | p-values (IP) | p-values (ET) | p-values (Uniform) |
|---|---|---|---|
| B/T | 3.08e−7 | 5.56e−7 | 1.83e−5 |
| T/E | 3.84e−7 | 9.28e−7 | 4.20e−6 |
| E/X | 9.32e−6 | 8.28e−5 | 0.012 |
| X/DCB | 5.95e−6 | 2.06e−5 | 2.28e−5 |

Table 7 shows peak capacities, p-values, and focusing rates between forward mode and identical parameters (IP) and equal time (ET) backward modes, and uniform thickness for aromatics separation in FIGS. 7A-7D. Significance is taken at p=0.05. Separation in forward mode is significantly better than separation in all other modes.

TABLE 7

| | |
|---|---|
| Forward peak capacity | 13.47 ± 0.089 |
| Backward peak capacity (IP) | 9.59 ± 0.060 |
| p-value (IP) | 1.60e−7 |
| Focusing rate (IP) | 40.35% |
| Backward peak capacity (ET) | 9.85 ± 0.093 |
| p-value (ET) | 1.56e−6 |
| Focusing rate (ET) | 36.73% |
| Uniform peak capacity | 10.50 ± 0.146 |
| p-value (uniform) | 1.13e−5 |
| Focusing rate (uniform) | 28.22% |

Temperature Ramping Effects

To demonstrate how temperature ramping rate affects peak focusing, separation of $C_7$ to $C_{10}$ with four different ramping rates (0, 10, 20, and 30° C./min, ramped from 60° C. without holding) is performed in forward mode, identical parameters backward mode, and using the uniform thickness column. The pressure is 3.45 psi (2.7 mL/min at 60° C.) and the split ratio is 15:1 for all separations (0.025 μL mixture liquid injection). The void time is measured by methane injection and is found to be 0.36 min for all ramping rates. Resolutions and focusing rates for each temperature profile are provided in Table 8 (values provided as averages over 5 runs). In forward mode, at higher temperature ramping rates, analytes encounter relatively higher temperatures by the time they reach the thicker stationary phase closer to the column outlet. The analyte thus spends less time in the thicker film and peak broadening is reduced. In backward mode, analytes first encounter the thicker stationary phase at lower temperatures before flowing to the thinner stationary phase at higher temperatures. Peak broadening from low thickness stationary phases is already low; therefore, the overall decrease in peak broadening due to increased temperature is lower in backward mode. Thus, the focusing rate increases with increased temperature ramping rate, up to 61.9% comparing forward and backward modes and 68.1% comparing forward mode and uniform thickness at a rate of 30° C./min.

Table 8 shows resolutions (R), peak capacities (PC), and focusing rates for forward mode, backward modes, and uniform thickness for C7 to C10 separation at various temperature ramping rates. The initial temperature is 60° C. for all separations and the carrier gas head pressure is 3.45 psi (2.7 mL/mi at 60° C.). 0.025 μL of mixture liquid is injected using a split ratio of 15:1.

TABLE 8

| Ramping rate (° C./min) | $R_{fwd}/R_{bkwd}/R_{uni}$ ($C_7/C_8$) | $R_{fwd}/R_{bkwd}/R_{uni}$ ($C_8/C_9$) | $R_{fwd}/R_{bkwd}/R_{uni}$ ($C_9/C_{10}$) | $PC_{fwd}/PC_{bkwd}/PC_{uni}$ | Focusing rate (bkwd/uni) |
|---|---|---|---|---|---|
| 0 | 4.59/3.40/2.74 | 5.86/4.68/4.86 | 6.73/5.68/7.43 | 17.18/13.76/15.02 | 24.85%/14.36% |
| 10 | 4.60/3.18/2.73 | 5.80/4.40/4.42 | 6.65/5.38/6.69 | 17.05/12.96/13.84 | 31.56%/21.63% |
| 20 | 4.43/2.86/2.53 | 5.51/3.94/4.02 | 6.39/4.88/5.77 | 16.32/11.68/12.32 | 39.73%/37.25% |
| 30 | 4.01/2.14/1.84 | 5.30/3.16/2.85 | 6.11/4.22/4.48 | 15.41/9.52/9.17 | 61.87%/68.09% |

Focusing for High Volatility Compounds

Unlike NTGS, an FTGC gradient is capable of focusing peaks at low temperatures (as long as these peaks are reasonably retained at these temperatures), where a temperature gradient is difficult to generate. To demonstrate this, room temperature isothermal separation (Table 1) of $C_5$ and $C_6$ is performed (FIGS. 9A-9C). Resolutions, p-value, and focusing rate are provided in Table 9 (values averaged over 5 runs). A focusing rate of 40.2% is achieved with an average forward mode resolution of 2.97 and uniform thickness resolution of 2.12. Note that for NTGS, the same peak focusing effect for high volatility compounds is difficult to achieve since only small temperature gradients can be generated at low operating temperatures.

Table 9 shows resolutions, p-values, and focusing rates for forward mode, backward mode, and uniform thickness for room temperature (26° C.) $C_5$ and $C_6$ separation. Significance is taken at p=0.05.

TABLE 9

| Forward resolution | 2.97 ± 0.140 |
|---|---|
| Backward resolution | 1.85 ± 0.055 |
| p-value (backward) | 1.17e−4 |
| Focusing rate (backward) | 60.4% |
| Uniform resolution | 2.12 ± 0.049 |
| p-value (uniform) | 4.87e−4 |
| Focusing rate (uniform) | 40.2% |

Development and evaluation of a stationary phase thickness gradient column technique that enables peak focusing has been detailed herein. Experimental results are corroborated by theoretical analysis and simulation, showing increased separation performance of various compounds in forward mode, including focused separation of high volatility compounds at room temperature. Compared to NTGS, the FTGC has advantages in larger applicable temperature and compound volatility ranges, simple operation without accessories, less dependence on ambient conditions, and greater compactness. This stationary phase thickness gradient technique can be facilely applied to wide-ranging GC applications and can be used for stationary phases of any materials or thicknesses, provided only that a gradient can be generated. Furthermore, it is applicable to both regular circular cross-sectioned capillary columns and rectangular cross-sectioned microfabricated columns.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gas chromatography device for peak focusing of one or more target analytes, comprising:
    a chromatographic column with an inlet and an outlet, wherein the inlet receives a sample comprising one or more target analytes that exits the chromatographic column at the outlet; and
    a stationary phase deposited inside the chromatographic column and having a positive thickness gradient, wherein the stationary phase extends from the inlet to the outlet and has a first thickness at the inlet of the chromatographic column and a second thickness at the outlet of the chromatographic column, wherein the second thickness is at least about 10% greater than the first thickness.

2. The gas chromatography device of claim 1, wherein the first thickness is greater than or equal to about 10 nm to less than or equal to about 10 micrometers and the second thickness is greater than or equal to about 30 nm to less than or equal to about 30 micrometers.

3. The gas chromatography device of claim 1, wherein the second thickness is at least about 100% greater than or equal to the first thickness.

4. The gas chromatography device of claim 1, wherein the second thickness is at least about 300% greater than or equal to the first thickness.

5. The gas chromatography device of claim 1, wherein the chromatographic column is a microgas chromatographic column.

6. The gas chromatography device of claim 1, wherein the stationary phase comprises a siloxane polymer.

7. The gas chromatography device of claim 6, wherein the siloxane polymer comprises at least one alkyl group or aryl group comprising 1 to 30 carbon atoms.

8. The gas chromatography device of claim 1, wherein a cross-sectional shape of the chromatographic column is selected from the group consisting of: circular, oval, rectangular, and triangular.

9. A method of peak focusing in a gas chromatography device, comprising:
    introducing two or more target analytes into an inlet of a chromatographic column comprising a stationary phase deposited inside the chromatographic column and having a positive thickness gradient, wherein the stationary phase extends from the inlet to an outlet and has a first thickness at the inlet of the chromatographic column and a second thickness at the outlet of the chromatographic column, wherein the second thickness is at least about 10% greater than the first thickness;
separating two or more target analytes in the chromatographic column; and
eluting the two or more target analytes from the outlet of the chromatographic column.

10. The method of claim 9, wherein the two or more target analytes are volatile organic compounds (VOCs).

11. The method of claim 9, wherein at least one of the two or more target analytes comprises an aromatic compound and an overall peak focusing rate for the aromatic compound is greater than or equal to about 25%.

12. The method of claim 9, wherein at least one of the two or more target analytes comprises an alkane compound and an overall peak focusing rate for the alkane compound is greater than or equal to about 10%.

13. The method of claim 9, wherein the first thickness is greater than or equal to about 10 nm to less than or equal to about 10 micrometers and the second thickness is greater than or equal to about 30 nm to less than or equal to about 30 micrometers.

14. The method of claim 9, wherein the second thickness is at least about 300% greater than or equal to the first thickness.

15. The method of claim 9, wherein the chromatographic column is a microgas chromatographic column.

16. The method of claim 9, wherein the stationary phase comprises a siloxane polymer comprising at least one alkyl group or aryl group comprising 1 to 30 carbon atoms.

17. The method of claim 9, wherein a cross-sectional shape of the chromatographic column is selected from the group consisting of: circular, oval, rectangular, and triangular.

18. A method of verifying peak focusing in a gas chromatography device, comprising:
conducting a forward operation by introducing two or more target analytes into an inlet of a chromatographic column comprising a stationary phase deposited inside the chromatographic column and having a positive thickness gradient, wherein the stationary phase extends from the inlet to an outlet of the chromatographic column and has a first thickness at the inlet of the chromatographic column and a second thickness at the outlet, wherein the second thickness is at least about 10% greater than the first thickness;
separating the two or more target analytes in the chromatographic column;
eluting the two or more target analytes from the outlet of the chromatographic column;
conducting a reverse operation by introducing the two or more target analytes into the outlet of the chromatographic column comprising the stationary phase;
separating the two or more target analytes in the chromatographic column;
eluting the two or more target analytes from the inlet of the chromatographic column; and
comparing chromatographic resolutions from the forward operation and the reverse operation, wherein a peak focusing rate for at least one corresponding pair of two peaks from two target analytes is greater than 5%.

* * * * *